US008723641B2

(12) United States Patent
Sadighi et al.

(10) Patent No.: US 8,723,641 B2
(45) Date of Patent: *May 13, 2014

(54) ACCESS CONTROL SYSTEM AND METHOD FOR OPERATING SAID SYSTEM

(71) Applicant: Telcred AB, Stockholm (SE)

(72) Inventors: Babak Sadighi, Taby (SE); Ling Cao, Solna (SE); Ludwig Seitz, Stockholm (SE)

(73) Assignee: Telcred AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,490

(22) Filed: Jun. 18, 2013

(65) Prior Publication Data

US 2013/0285793 A1 Oct. 31, 2013

Related U.S. Application Data

(62) Division of application No. 12/226,765, filed as application No. PCT/SE2007/050266 on Apr. 24, 2007, now Pat. No. 8,482,378.

(30) Foreign Application Priority Data

Apr. 28, 2006 (SE) ...................................... 0600959

(51) Int. Cl.
*G05B 19/00* (2006.01)
*E05B 53/00* (2006.01)

(52) U.S. Cl.
USPC ............... 340/5.61; 340/5.2; 70/263; 70/266; 380/247; 713/171

(58) Field of Classification Search
USPC .................. 380/247; 713/171; 340/5.2, 5.61; 70/263, 266
See application file for complete search history.

(56) References Cited

U.S. PATENT DOCUMENTS 4,727,368 A * 2/1988 Larson et al. ................... 340/5.6
5,541,581 A * 7/1996 Trent ........................... 340/5.55

(Continued)

FOREIGN PATENT DOCUMENTS

| EP | 1 626 372 | 2/2006 |
|---|---|---|
| GB | 23645202 | 1/2002 |

OTHER PUBLICATIONS

Supplementary European Search Report in corresponding European Application No. 07748427.7, date of Search Nov. 17, 2010.

(Continued)

*Primary Examiner* — Daniel Wu
*Assistant Examiner* — Kam Ma
(74) *Attorney, Agent, or Firm* — Nixon & Vanderhye PC

(57) ABSTRACT

A system uses a mobile unit to control access to physical spaces with electrical locking devices. An authority means connected to the mobile unit issues authorizing data (AD) access rights, which are sent to an authorization means connected to the authority means, generate a mobile unit alpha-numerical key and send the key and the mobile unit's unique identifier to an operator connected to the authorization means. The operator sends the alpha-numerical key to the mobile unit identified by the unique identifier. An electrical locking device and the mobile unit use an authentication protocol with the alpha-numerical key to authenticate the mobile unit, which, when authenticated, sends the authorizing data (AD) to the electrical locking device. If the authorizing data (AD) comprises an identifier of the electrical locking device, the mobile unit can open the electrical locking device using a communication means in the mobile unit for near field communication.

25 Claims, 8 Drawing Sheets

(56) References Cited

U.S. PATENT DOCUMENTS

| | | | |
|---|---|---|---|
| 5,721,781 A * | 2/1998 | Deo et al. | 705/67 |
| 5,933,503 A * | 8/1999 | Schell et al. | 713/189 |
| 6,567,915 B1 * | 5/2003 | Guthery | 713/168 |
| 7,114,178 B2 * | 9/2006 | Dent et al. | 726/6 |
| 7,184,047 B1 * | 2/2007 | Crampton | 345/473 |
| 7,310,813 B2 * | 12/2007 | Lin et al. | 726/3 |
| 7,457,418 B2 * | 11/2008 | Bunte et al. | 380/278 |
| 7,464,402 B2 * | 12/2008 | Briscoe et al. | 726/5 |
| 7,561,019 B2 * | 7/2009 | Sasakura et al. | 340/5.1 |
| 7,646,394 B1 * | 1/2010 | Neely et al. | 345/633 |
| 7,859,386 B2 * | 12/2010 | Lundkvist | 340/5.27 |
| 8,103,247 B2 * | 1/2012 | Ananthanarayanan et al. | 455/411 |
| 2002/0087263 A1 * | 7/2002 | Wiener | 701/207 |
| 2002/0178385 A1 * | 11/2002 | Dent et al. | 713/202 |
| 2002/0180582 A1 * | 12/2002 | Nielsen | 340/5.6 |
| 2003/0151493 A1 * | 8/2003 | Straumann et al. | 340/5.25 |
| 2003/0184431 A1 * | 10/2003 | Lundkvist | 340/5.2 |
| 2003/0194089 A1 * | 10/2003 | Kansala et al. | 380/270 |
| 2004/0103063 A1 * | 5/2004 | Takayama et al. | 705/41 |
| 2004/0116074 A1 * | 6/2004 | Fujii et al. | 455/41.2 |
| 2004/0123159 A1 * | 6/2004 | Kerstens et al. | 713/202 |
| 2005/0021479 A1 | 1/2005 | Jorba et al. | |
| 2005/0053241 A1 * | 3/2005 | Fan et al. | 380/270 |
| 2006/0290519 A1 * | 12/2006 | Boate et al. | 340/573.4 |
| 2007/0065142 A1 * | 3/2007 | Liang | 396/429 |
| 2008/0089517 A1 * | 4/2008 | Bianco et al. | 380/259 |
| 2008/0191009 A1 * | 8/2008 | Gressel et al. | 235/382 |
| 2008/0192721 A1 * | 8/2008 | Pernu et al. | 370/345 |
| 2008/0309458 A1 * | 12/2008 | Fisher | 340/5.73 |
| 2009/0183541 A1 * | 7/2009 | Sadighi et al. | 70/263 |
| 2009/0184801 A1 * | 7/2009 | Bliding et al. | 340/5.61 |
| 2010/0176919 A1 * | 7/2010 | Myers et al. | 340/5.73 |
| 2011/0071675 A1 * | 3/2011 | Wells et al. | 700/250 |
| 2011/0254661 A1 * | 10/2011 | Fawcett et al. | 340/5.61 |

OTHER PUBLICATIONS

Beaufour, A., "Personal Servers as Digital Keys" in: Proceedings of the Second IEEE Annual Conference on Pervasive Computing and Communications, pp. 319-328, (Mar. 14-17, 2004).

International Search Report for PCT/SE2007/050266, mailed Aug. 10, 2007.

Written Opinion of the International Searching Authority for PCT/SE2007/050266, mailed Aug. 10, 2007.

* cited by examiner

ACCESS CONTROL SYSTEM AND METHOD FOR OPERATING SAID SYSTEM

This application is a divisional of U.S. patent application Ser. No. 12/226,765, filed 28 Oct. 2008, which is the U.S. national phase of International Application No. PCT/SE2007/050266, filed 24 Apr. 2007, which designated the U.S. and claims priority to Swedish Application No. 0600959-1, filed 28 Apr. 2006, the entire contents of each of which is incorporated herein by reference.

FIELD OF THE INVENTION

The present invention relates, in a first aspect to a system operable to control access to different physical spaces.

According to a second aspect, the present invention relates to a method for controlling access to different physical spaces.

According to a third aspect, the present invention relates to at least one computer software product for controlling access to different physical spaces.

BACKGROUND OF THE INVENTION

At present, traditional metal keys and/or passes are often used to open locks in connection with doors, whereby passes often are combined with the use of a code. When electrical locks are being used more frequently, different solutions for wireless unlocking or locking of electrical locks have been presented.

The document WO-A2-2005/066908 discloses an access control system and a method for operating said system. The system comprises an access control system (2-4, 8) (see figure), which controls a plurality of access points (1), e.g. doors (1) by means of respective individual physical closing mechanisms (8). At least one reader (2) and a controller (3), which is connected to the latter in order to control the closing mechanism (8), are provided at each access point (1). The system also comprises at least one access control server (4), which carries out the centralised management of access data and is connected to the respective controllers (3). The system also comprises at least one mobile telephone server (5), which is connected to the access control server (4). The mobile telephone server (5) can also be an integral component of the access control server (4). At least one access point (1) is equipped with a short-range transmitter (9), which transmits identification information that is specific to the access point in such a way that it is only received by a mobile telephone (7) located in the direct vicinity of the access point (1) and is used at least indirectly by the telephone to control the access verification process. The document discloses the use of Bluetooth or WLAN transmitters (9). As is apparent from the figure, each access point (1) has to be connected to the access control server (4) which is a drawback in relation to your idea. Another difference in relation to our solution is that the user actually has to call the access control server (4). Moreover, authentication is performed with the aid of the calling number and a PIN code, which is not the case in your solution.

The document WO-A1-01/63425 discloses a system and method for, by means of a mobile terminal, wireless hotel search and selection, reservation/booking, check-in, room access control, check-out and payment services for hotel customers. After successful reservation, the wireless door lock system of the reserved room receives information about the valid key token, or a secret key, from the hotel reservation/IT system. By means of the short range wireless device in the mobile wireless terminal, the key token is transmitted to nearby wireless devices associated with electrically operable door locks. On receiving the appropriate key token from the wireless device in the mobile terminal, the door lock wireless device of the reserved room can notify the associated hotel reservation/IT system of the arrival of the user for check-in, and unlocks the door. The communication protocol between the mobile terminal and the wireless door lock system is performed over a Bluetooth, Infrared or other suitable bearer. To achieve optimal security, this information could be protected in the user's terminal by means of a PIN code, fingerprint or other local authentication methods.

The document 20051201ddm France Telecom, "Focus on contact less technology", DDM du mois, France Telecom, describes briefly the use of NFC (Near Field Communication) technology integrated in a mobile telephone to open gates and barriers for instance in parking lots.

The document EP-A1-1,600,885 relates to a SIM reader/writer provided with a detachable SIM having contact and non-contact interfaces. The SIM reader/writer can be used for non-contact gate management in transportation facilities. In FIG. 28 there is disclosed a perspective view of assistance in explaining a mode of using a non-contact communication device to operate a ticket gate. A non-contact communication device 201 having the function of an IC card is brought into contact with a receiving unit 208 installed in a ticket gate 207 of transportation facilities in the direction of the arrow Y. Then the receiving unit 208 of the ticket gate 207 receives an electromagnetic wave emitted by the non-contact communication device 201, and then a door 209 is opened or kept closed. The non-contact communication device 201 can be similarly used for operating the doors of a building of a corporation and the entrance of facilities.

The document US-A1-2004/0127256 relates to a mobile device that is equipped with a contact-less smart card reader/writer for conducting financial transactions with a contact-less smart card. The mobile device can be used for shopping with authentication via a telecommunication network.

The document US-A1-2005/0210283 relates to a key system 10 (see FIG. 1) for locking and unlocking a door 12 of a room, house, office or other such structure. Installed in the door 12 is a lock device 14 that locks and unlocks the door 12 in cooperation with a paired key device 16. In the key system 10, the lock device 14 and key device 16 exchange key information by short-range wireless communication, the lock device 14 authenticates the key information received from the key device 16, and the door 12 is unlocked if the authentication succeeds. The key device 16 has a page button 18 for initiating transmission of the key information, and functions uniquely for transmitting the key information when the page button 18 is pressed, The short-range wireless communication technology is used in this embodiment is the Bluetooth Technology®.

The document US-A1-2002/0130763 describes a security system to enable authenticated access of an individual to a protected area, including a remote control unit (22) (see FIG. 1) with a transponder (28), carried by the individual, which transmits an identification code group on reception of an interrogation signal. A control unit located within the protected area transmits an interrogation signal when activated by the individual, and verifies the identification code group received from the transponder. Access to the protected area will only be permitted on positive verification of the right to access. The transponder (28), contained within the remote control unit (22) is a passive transponder which obtains a supply voltage from the interrogation signal transmitted by the control unit (16) and then feeds this to a supply voltage rail. The remote control unit (22) contains a battery (34) that can be connected to the supply voltage rail (46) by means of a controllable battery coupling switch (42) via a high-resistance path when the remote control unit (22) is in its quiescent state or via a low-resistance path when the remote control unit (22) is in its active state. A pulse detector (58) obtains its supply voltage in the quiescent state of the remote control unit (22) via the high-resistance path of the battery coupling switch (42). On reception of the interrogation signal by the transponder (28), the pulse detector (58) outputs a recognition signal. A remote-field detector (64) receives the recognition signal and outputs a remote-field signal as soon as the value of the recognition signal comes within a predetermined range.

None of the above mentioned documents presents a solution supporting the following essential features:
At least as secure as magnetic card and smart card solutions
Support for fine-grained access rights
Decentralised administration of access rights
Remote distribution and revocation of access rights (no need for face to face distribution and revocation of keys, and no need for reprogramming of to locks)
Managing access to remotely located locks with very limited power supply and no or temporary communication abilities.

SUMMARY OF THE INVENTION

The above mentioned problems are solved by a system operable to control access to different physical spaces according to Claim 1. Each physical space is provided with an electrical locking device. The system is operable with the aid of a programmable, mobile unit. The system comprises an authority means operable to issue access rights connected to said programmable, mobile unit in the form of an authorizing data (AD), which authorizing data (AD) is sent to an authorization means connected to the authority means. The authorization means is operable to generate an alphanumerical key for the programmable, mobile unit, and to send the alphanumerical key and a unique identifier of the mobile unit to an operator which is connected to the authorization means. The operator is operable to send the alphanumerical key to the mobile unit identified by the unique identifier. An electrical locking device and the mobile unit use an authentication protocol with the alphanumerical key to authenticate the mobile unit. If the mobile unit has been authenticated, it sends the authorizing data (AD) to the electrical locking device. If the authorizing data (AD) comprises an identifier of the electronic locking device, the mobile unit is able to open the electrical locking device with the aid of a communication means comprised in the mobile unit for communication in the near field.

A main advantage with this system according to the present invention, is that it supports the following essential features:
At least as secure as magnetic card and smart card solutions
Support for fine-grained access rights
Decentralised administration of access rights
Remote distribution and revocation of access rights (no need for face to face distribution and revocation of keys, and no need for reprogramming of locks)
Managing access to remotely located locks with very limited power supply and no or temporary communication abilities.

A further advantage in this context is achieved if said unique identifier of said mobile unit is a number, and in that said authorizing data (AD) comprises an identification ($ID_1; \ldots; ID_n$) of each locking device which said mobile unit (14) should be able to open.

Furthermore, it is an advantage in this context if said alphanumerical key is a symmetric, secret key (kp), and in that a physical space is provided with an electrical master locking device, wherein said authorization means also is operable to send said secret key (kp) and said number identifying said mobile unit to said master locking device.

A further advantage in this context is achieved if said master locking device and said mobile unit use said authentication protocol with said secret key (kp) to authenticate said mobile unit.

Furthermore, it is an advantage in this context if said master locking device is operable, after said mobile unit has been authenticated, to send an authorization request to said authorization means whereafter said authorization means also is operable to send said authorizing data (AD) concatenated with a message authentication code ($MAC_{kl}(AD)$), and an encrypted, secret key of said mobile unit with a symmetric key (kl) ($E_{kl}(kp)$) to said master locking device.

A further advantage in this context is achieved if said master locking device also is operable to send said authorizing data (AD) concatenated with said message authentication code ($MAC_{kl}(AD)$), and said encrypted secret key of said mobile unit with said symmetric key (kl) ($E_{kl}(kp)$) to said mobile unit with the aid of a communication means comprised in said master locking device for communication in the near field.

Furthermore, it is an advantage in this context if said mobile unit is operable to send said encrypted secret key of said mobile unit with said symmetric key (kl) ($E_{kl}(kp)$) to said electrical locking device, which in turn also is operable to retrieve said secret key (kp) by decrypting $E_{kl}(kp)$ with said symmetric key (kl).

A further advantage in this context is achieved if mobile unit also is operable to send said authorizing data (AD) concatenated with said message authentication code ($MAC_{kl}(AD)$) to said electrical locking device, whereby said electrical locking device is operable to verify the validity of said authorizing data (AD) with said message authentication code (MAC) and said symmetric key (kl).

According to another embodiment, it is an advantage if said alphanumerical key is a symmetric, secret key (kp), wherein said authorization means also is operable to generate said secret key (kp), said authorizing data (AD) concatenated with a message authentication code ($MAC_{kl}(AD)$), and an encrypted, secret key of said mobile unit with a symmetric key (kl) ($E_{kl}(kp)$), and to send said secret key (kp), said authorizing data (AD) concatenated with said message authentication code ($MAC_{kl}(AD)$), said encrypted secret key of said mobile unit with said symmetric key ($E_{kl}(kp)$), and said number to said operator.

A further advantage in this context is achieved if said operator also is operable to send, besides said secret key (kp), said authorizing data (AD) concatenated with said message authentication code ($MAC_{kl}(AD)$), and said encrypted secret key of said mobile unit with said symmetric key ($E_{kl}(kp)$) to said mobile unit.

Furthermore, it is an advantage in this context if said mobile unit also is operable to establish a communication channel in the near field with said electrical locking device, and to send said encrypted secret key of said mobile unit with said symmetric key ($E_{kl}(kp)$) to said electrical locking device, which in turn also is operable to retrieve said secret key (kp) by decrypting $E_{kl}(kp)$ with said symmetric key (kl).

A further advantage in this context is achieved if said mobile unit also is operable to send said authorizing data (AD) concatenated with said message authentication code ($MAC_{kl}(AD)$) to said electrical locking device, whereby said electrical locking device is operable to verify the validity of said authorizing data (AD) with said message authentication code (MAC) and said symmetric key (kl).

According to another embodiment, it is an advantage if said alphanumerical key is an asymmetric key pair (privP, publP), wherein said authorization means also is operable to generate said asymmetric key pair (privP, publP), a certificate (certP), and an authorizing data (AD) electronically signed by said authorization means private key (privA), ($Sign_{privA}$ (AD)) for said mobile unit, and to send said authorizing data (AD), said private key (privP) of said mobile unit, said certificate (certP), said public key (pubA) of said authorization means, said authorization data electronically signed by said authorization means private key ($Sign_{privA}$ (AD)), and said number to said operator.

A further advantage in this context is achieved if said operator also is operable to send said authorizing data (AD), said private key (privP) of said mobile unit, said certificate (certP), said public key (pubA) of said authorization means, and said authorization data electronically signed by said authorization means private key ($Sign_{privA}$ (AD)) to said mobile unit.

Furthermore, it is an advantage in this context if said mobile unit also is operable to establish a communication channel in the near filed with said electrical locking device, and to send said certificate (certP) to said electrical locking device, and to receive a certificate of said locking device containing its public key (privL) (certL) from said electrical locking device.

A further advantage in this context is achieved if said mobile unit and said electrical locking device are operable to authenticate each other using their certificates (certP, certL) and their private keys (privP, privL) with the aid of a two-way Authentication protocol.

Furthermore, it is an advantage in this context if mobile unit also is operable, if said mobile unit and said electrical locking device have been authenticated, to send said authorizing data (AD) and said authorization data electronically signed by said authorization means private key ($Sign_{privA}$ (AD)) to said electrical locking device, which verifies said signature.

The above mentioned problems are furthermore solved by a method for controlling access to different physical spaces according to Claim 18. Each physical space is provided with an electrical locking device. The method is carried out by means of a programmable, mobile unit and a system. The method comprises the steps of:
- an authority means comprised in said system issues access rights connected to said mobile unit in the form of an authorizing data (AD);
- to send said authorizing data (AD) to an authorization means comprised in said system and connected to said authority means;
- said authorization means generates an alphanumerical key for said mobile unit;
- to send said alphanumerical key and a unique identifier of said mobile unit to an operator which is connected to said authorization means;
- said operator sends said alphanumerical key to said mobile unit identified by said unique identifier;
- wherein an electrical locking device, wherein 1≤i≤n, and said mobile unit use an authentication protocol with said alphanumerical key to authenticate said mobile unit;
- if said mobile unit has been authenticated, it sends said authorizing data (AD) to said electrical locking device;
- to verify the validity of the authorization data (AD); and
- if said authorizing data (AD) comprises an identifier of said electrical locking device, said mobile unit is able to open said electrical locking device with the aid of a communication means comprised in said mobile unit for communication in the near field.

A main advantage with this method according to the present invention, is that it support the following essential features:
- At least as secure as magnetic card and smart card solutions
- Support for fine-grained access rights
- Decentralised administration of access rights
- Remote distribution and revocation of access rights (no need for face to face distribution and revocation of keys, and no need for reprogramming of locks)
- Managing access to remotely located locks with very limited power supply and no or temporary communication abilities.

A further advantage in this context is achieved if said unique identifier of said mobile unit is a number, and in that said authorizing data (AD) comprises an identification ($ID_1$; . . . ; $ID_n$) of each locking device which said mobile unit should be able to open.

Furthermore, it is an advantage in this context if alphanumerical key is a symmetric, secret key (kp), and in that a physical space is provided with an electrical master locking device, wherein said method also comprises the step:
- said authorization means sends said secret key (kp) and said number identifying said mobile unit to said master locking device.

A further advantage in this context is achieved if method also comprises the step:
- to authenticate said mobile unit with the aid of said master locking device and said mobile unit using said authentication protocol with said secret key (kp).

Furthermore, it is an advantage in this context if said method also comprises the steps:
- if said mobile unit has been authenticated, with the aid of said master locking device, to send an authorization request to said authorization means; and
- with the aid of said authorization means, to send said authorizing data (AD) concatenated with a message authentication code ($MAC_{kl}$(AD)), and an encrypted secret key of said mobile unit with a symmetric key (kl) ($E_{kl}$(kp)) to said master locking device.

A further advantage in this context is achieved if said method also comprises the step:
- with the aid of said master locking device, to send said authorizing data (AD) concatenated with said message authentication code ($MAC_{kl}$(AD)), and said encrypted secret key of said mobile unit with said symmetric key (kl) ($E_{kl}$(kp)) to said mobile unit with the aid of a communication means comprised in said master locking device for communication in the near field.

Furthermore, it is an advantage in this context if said method also comprises the steps:
- with the aid of said mobile unit, to send said encrypted secret key of said mobile unit with said symmetric key (kl) ($E_{kl}$(kp)) to said electrical locking device; and
- with the aid of said electrical locking device, to retrieve said secret key (kp) by decrypting $E_{kl}$(kp) with said symmetric key (kl).

A further advantage in this context is achieved if said method also comprises the steps:
- with the aid of said mobile unit, to send said authorizing data (AD) concatenated with said message authentication code ($MAC_{kl}$(AD)) to said to electrical locking device; and with the aid of said electrical locking device, to verify the validity of said authorizing data (AD) with said message authentication code (MAC) and said symmetric key (kl).

According to another embodiment, it is an advantage if said alphanumerical key is a symmetric, secret key (kp), and in that said method also comprises the steps:

with the aid of said authorization means, to generate said secret key (kp), said authorizing data (AD) concatenated with a message authentication code ($MAC_{kl}(AD)$), and an encrypted, secret key of said mobile unit with a symmetric key (kl) ($E_{kl}(kp)$); and to send said secret key (kp), said authorizing data (AD) concatenated with said message authentication code ($MAC_{kl}(AD)$), said encrypted secret key of said mobile unit with said symmetric key ($E_{kl}(kp)$), and said number of the mobile unit to said operator.

A further advantage in this context is achieved if said method also comprises the step:

with the aid of said operator, to send, besides said secret key (kp), said authorizing data (AD) concatenated with said message authentication code ($MAC_{kl}(AD)$), and said encrypted secret key of said mobile unit with said symmetric key ($E_{kl}(kp)$) to said mobile unit.

Furthermore, it is an advantage in this context if said method also comprises the steps:

with the aid of said mobile unit, to establish a communication channel in the near field with said electrical locking device;

to send said encrypted key of said mobile unit with said symmetric key ($E_{kl}$ (kp)) to said electrical locking device; and with the aid of said electrical locking device, to retrieve said secret key (kp) by decrypting $E_{kl}(kp)$ with said symmetric key (kl).

A further advantage in this context is achieved if said method also comprises the steps:

with the aid of said mobile unit, to send said authorizing data (AD) concatenated with said message authentication code ($MAC_{kl}(AD)$) to said electrical locking device; and with the aid of said electrical locking device, to verify the validity of said authorizing data (AD) with aid message authentication code (MAC) and said symmetric key (kl).

According to another embodiment, it is an advantage if said alphanumerical key is an asymmetric key pair (privP, publP), and in that said method also comprises the steps:

with the aid of said authorization means, to generate said asymmetric key pair (privP, publP), a certificate (certP), and an authorizing data (AD) electronically signed by said authorization means private key (privA), ($Sign_{privA}$ (AD)) for said mobile unit; and to send said authorizing data (AD), said private key (privP) of said mobile unit, said certificate (certP), said public key (pubA) of said authorization means, said authorization data electronically signed by said authorization means private key ($Sign_{privA}$ (AD)), and said number of the mobile unit to said operator.

A further advantage in this context is achieved if said method also comprises the step:

with the aid of said operator, to send said authorizing data (AD), said private key (privP) of said mobile unit, said certificate (certP), said public key (pubA) of said authorization means and said authorization data electronically signed by said authorization means private key ($Sign_{privA}$ (AD)) to said mobile unit.

Furthermore, it is an advantage in this context if said method also comprises the steps:

with the aid of said mobile unit, to establish a communication channel in the near field with said electrical locking device;

to send said certificate (certP) to said electrical locking device; and to receive a certificate of said locking device containing its public key (privL) (certL) from said electrical locking device.

A further advantage in this context is achieved if said method also comprises the step:

with the aid of said mobile unit and said electrical locking device, to authenticate each other using their certificates (certP, certL) and their private keys (privP, privL) with the aid of a two-way Authentication protocol.

Furthermore, it is an advantage in this context if said method also comprises the step:

if said mobile unit and said electrical locking device have been authenticated, with the aid of said mobile unit, to send said authorizing data (AD), and said authorization data electronically signed by said authorization means private key ($Sign_{privA}$ (AD)) to said electrical locking device.

The above mentioned problems are furthermore solved by at least one computer program product according to Claim 35.

A main advantage with the at least one computer program product according to the present invention, is that it/they support the following essential features:

At least as secure as magnetic card and smart card solutions

Support for fine-grained access rights

Decentralised administration of access rights

Remote distribution and revocation of access rights (no need for face to face distribution and revocation of keys, and no need for reprogramming of locks)

Managing access to remotely located locks with very limited power supply and no or temporary communication abilities.

Embodiments of the invention will now be described, reference being made to the accompanying drawings, where:

DETAILED DESCRIPTION OF PREFERRED EMBODIMENTS

Figure 1:
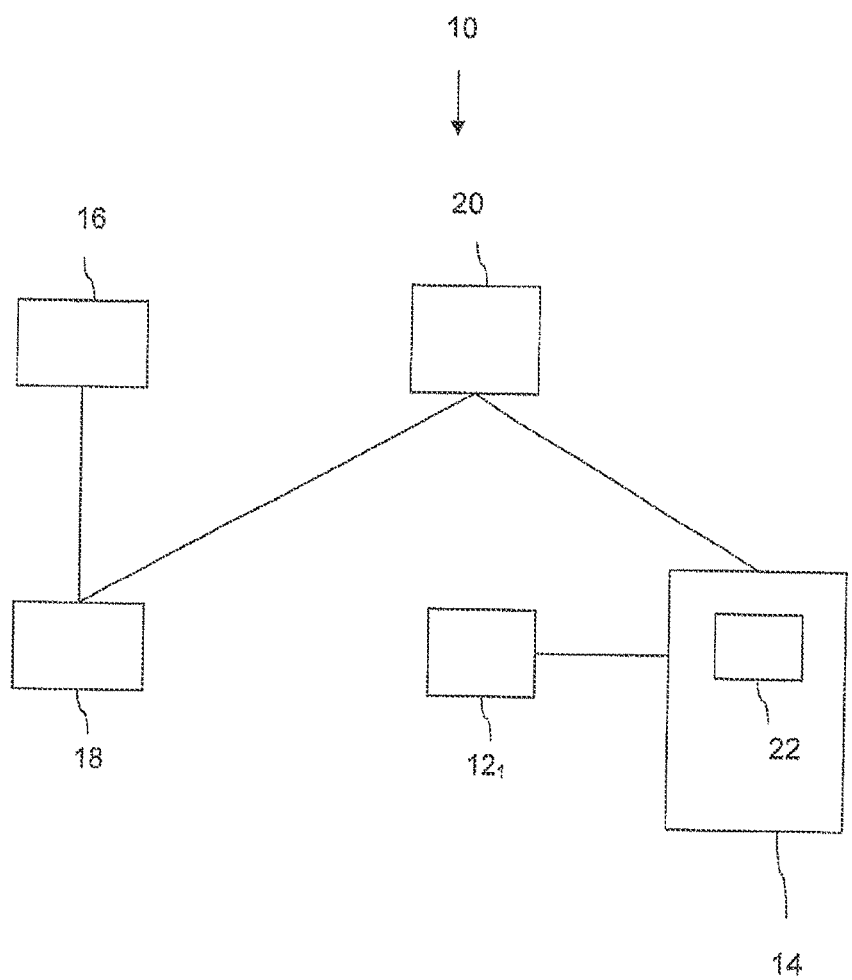
FIG. 1 shows a block diagram of a first embodiment of a system operable to control access to different physical spaces according to the present invention.

In FIG. 1 there is disclosed a block diagram of a first embodiment of a system 10 operable to control access to different physical spaces according to the present invention. Each physical space is provided with an electrical locking device $12_1, \ldots 12_n$, where n is an integer. For the sake of simplicity, in FIG. 1 there is only disclosed one electrical locking device $12_1$. In FIG. 1 there is also disclosed a programmable, mobile unit 14 which plays an important role in this invention. The system 10 comprises an authority means 16 operable to issue access rights connected to the programmable, mobile unit 14 in the form of an authorizing data (AD). The authorizing data (AD) is sent from the authority means 16 to an authorization means 18 connected to the authority means 16. The authorization means 18 is operable to generate an alphanumerical key for the programmable, mobile unit 14 and to send the alphanumerical key and a unique identifier for the mobile unit 14 to an operator 20. As is apparent in FIG. 1, the operator 20 is connected to the authorization means 18. The operator 20 is operable to send the alphanumerical key to the mobile unit 14 identified by the unique identifier. The electrical locking device $12_1$ and the mobile unit 14 use an authentication protocol with the alphanumerical key to authenticate the mobile unit 14. If the mobile unit 14 has been authenticated, it sends the authorizing data (AD) to the electrical locking device $12_1$. If the authorizing data (AD) comprises an identifier of the electrical locking device $12_1$, the mobile unit 14 is able to unlock/lock the electrical locking device 14 with the aid of a communication means 22 comprised in the mobile unit 14 for communication in the near field. The communication means 22 can be based on NFC technology (Near Field Communication) which is a wireless technology, which makes it possible to establish communication between two objects, for instance between a mobile device and a base that has been equipped with an ad hoc antenna. NFC's specificity is that the communication is established over a distance of a few centimeters, or even with the two objects touching. This is the main difference with other wireless technologies such as Bluetooth® and WiFi that allow communication over a much larger distance.

According to a preferred embodiment of the system 10 according to the present invention, the unique identifier of the mobile unit 14 is a number, and the authorizing data (AD) comprises an identification $ID_1; \ldots ; IC_n$ of each locking device $12_1; \ldots ; 12_n$ which the mobile unit 14 should be able to open.

Figure 2:
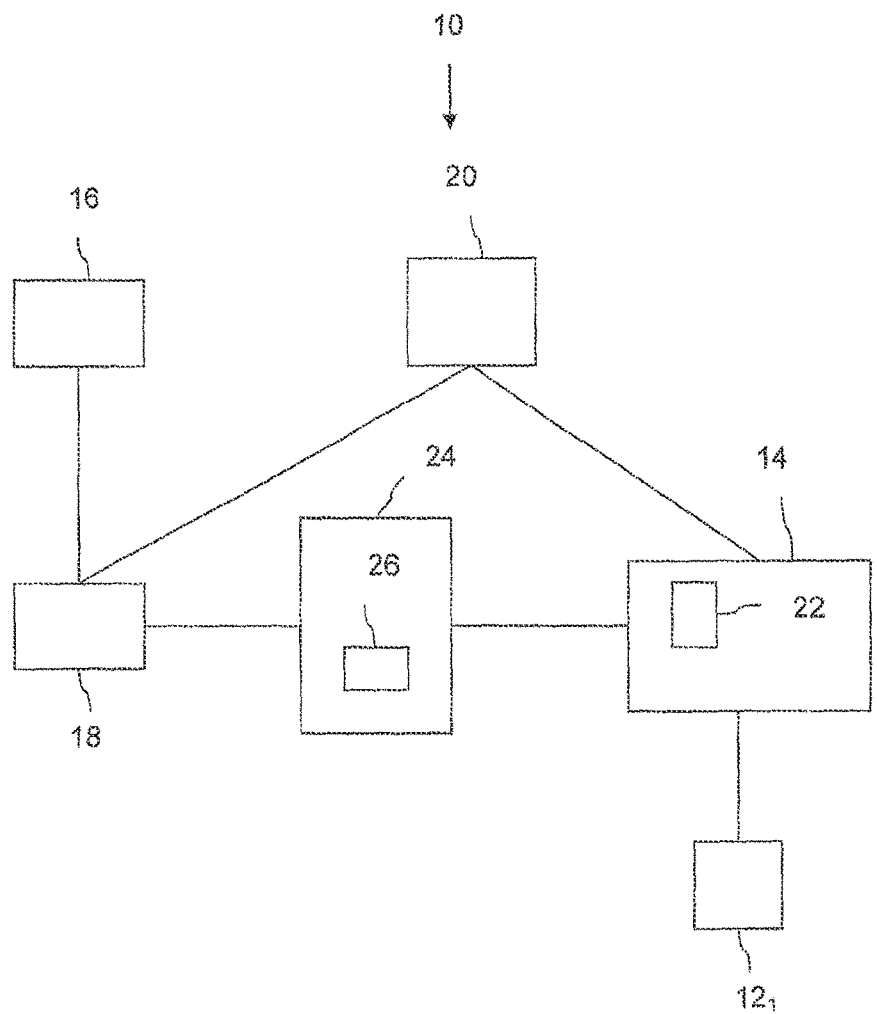
FIG. 2 shows a block diagram of a second embodiment of a system operable to control access to different physical spaces according to the present invention.

In FIG. 2 there is disclosed a block diagram of a second embodiment of a system 10 operable to control access to different physical spaces according to the present invention. The same functional elements in FIGS. 1 and 2 have been designated with the same reference signs and will not be described in detail again. In comparison to FIG. 1, FIG. 2 also discloses an electrical, master locking device 24 connected both to the authorization means 18 and the mobile unit 14. In this case, the alphanumerical key is a symmetric, secret key (kp), and a physical space is provided with the master locking device 24. The authorization means 18 is also operable to send the secret key (kp), and the number identifying the mobile unit 14 to the master locking device 24.

In a preferred embodiment of the system 10 according to the present invention, the master locking device 24 and the mobile unit 14 use the authentication protocol with the secret key (kp) to authenticate the mobile unit 14.

In another embodiment of the system 10 according to the present invention, the master locking device 24 is operable, after the mobile unit 14 has been authenticated, to send an authorization request to the authorization means 18. Thereafter, the authorization means 18 also is operable to send the authorizing to data (AD) concatenated with a message authentication code ($MAC_{kl}(AD)$), and an encrypted secret key of the mobile unit 14 with a symmetric key (kl) ($E_{kl}(kp)$) to the master locking device 24.

According to a further embodiment of the system, 10, the master locking device 24 also is operable to send the authorizing data (AD) concatenated with the is message authentication code ($MAC_{kl}(AD)$), and the encrypted secret key of the mobile unit 14 with the symmetric key (kl) ($E_{kl}(kp)$) to the mobile unit 14 with the aid of a communication means 26 comprised in the master locking device 24 for communication in the near field. (See FIG. 2.)

According to yet another embodiment of the system 10, the mobile unit 14 also is operable to send the encrypted secret key of the mobile unit 14 with the symmetric key (kl) ($E_{kl}(kp)$) to the electrical locking device $12_1$. The locking device $12_1$ is also operable to retrieve the secret key (kp) by decrypting $E_{kl}(kp)$ with the symmetric key (kl).

According to another embodiment of the system 10, the mobile unit 14 also is operable to send the authorizing data (AD) concatenated with the message authentication code ($MAC_{kl}(AD)$) to the electrical locking device $12_1$. Thereafter, the electrical locking device $12_1$ is operable to verify the validity of the authorizing data (AD) with the message authentication code (MAC) and the symmetric key (kl).

According to another preferred embodiment of the system 10 according to the present invention, the alphanumerical key is a symmetric, secret key (kp) and the authorization means 18 is operable to generate the secret key (kp), the authorizing data (AD) concatenated with a message authentication code ($MAC_{kl}(AD)$), and an encrypted secret key of the mobile unit 14 with a symmetric key (kl) $E_{kl}(kp)$). The authentization means 18 sends the secret key (kp), the authorizing data (AD) concatenated with the message authentication code ($MAC_{kl}(AD)$), the encrypted secret key of the mobile unit 14 with the symmetric key ($E_{kl}(kp)$), and the number of the mobile unit 14 to the operator 20.

According to another embodiment of the system 10, the operator 20 is also operable to send, besides the secret key (kp), the authorizing data (AD) concatenated with the message authentication code ($MAC_{kl}(AD)$), and the encrypted secret key of the mobile unit 14 with the symmetric key ($E_{kl}(kp)$) to the mobile unit 14.

According to yet another embodiment of the system 10, the mobile unit 14 is also operable to establish a communication channel in the near field with the electrical locking device $12_1$, and to send the encrypted secret key of the mobile unit 14 with the symmetric key ($E_{kl}(kp)$) to the electrical locking device $12_1$. The locking device $12_1$ is also operable to retrieve the secret key (kp) by decrypting $E_{kl}(kp)$ with the symmetric key (kl).

According to another embodiment of the system 10, the mobile unit 14 is also operable to send the authorizing data (AD) concatenated with the message authentication code ($MAC_{kl}(AD)$) to the electrical locking device $12_1$, which in turn is operable to verify the validity of the authorizing data (AD) with the message authentication code (MAC) and the symmetric key (kl).

According to another embodiment of the system 10 according to the present invention, the alphanumerical key is an asymmetric key pair (privP, publP). The authorization means 18 is also operable to generate the asymmetric key pair (privP, pubP), a certificate (certP), and an authorizing data (AD) electronically signed by the authorization means 18 private key (privA), ($Sign_{privA}(AD)$) for the mobile unit 14. The authorization means 18 is also operable to send the authorizing data (AD), the private key (privP) of the mobile unit 14, the certificate (certP), the public key (pubA) of the authorization means 18, the authorization data electronically signed by the authorization means 18 private key ($Sign_{privA}$ (AD)), and the number of the mobile unit 14 to the operator 20.

According to yet another embodiment of the system 10, the operator 20 is also operable to send the authorizing data (AD), the private key (privP) of the mobile unit 14, the certificate (certP), the public key (pubA) of the authorization means 18, and the authorization data electronically signed by the authorization means 18 private key ($Sgin_{privA}$ (AD)) to the mobile unit 14.

According to another embodiment of the system 10, the mobile unit 14 is also operable to establish a communication channel in the near field with the electrical locking device 12₁, and to send the certificate (certP) to the electrical locking device 12₁. The mobile unit 14 is also operable to receive a certificate of the locking device 12₁ containing its public key (publ. L) (CertL) from the electrical locking device 12₁.

According to yet another embodiment of the system 10, the mobile unit 14 and the electrical locking device 12₁ are operable to authenticate each other using their certificates (certP, certL), and their private keys (privP, privL) with the aid of a two-way Authentication protocol.

According to another embodiment of the system 10, the mobile unit 14 also is operable, if the mobile unit 14 and the electrical locking device 12₁ have been authenticated, to send the authorizing data (AD) and the authorization data electronically signed by the authorization means 18 private key ($Sign_{privA}$ (AD)) to the electrical locking device 12₁.

Figure 3:
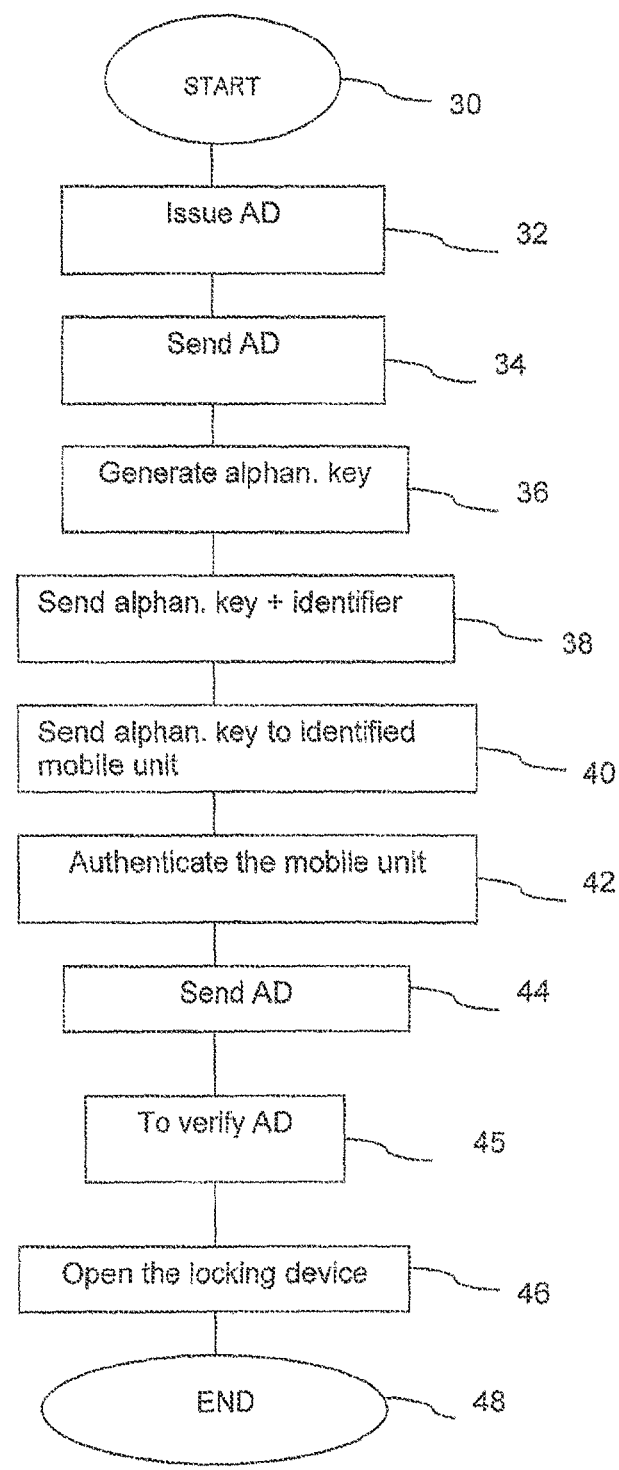
FIG. 3 shows a flow chart of a first embodiment of a method for controlling access to different physical spaces according to the present invention.

In FIG. 3 there is disclosed a flow chart of a first embodiment of a method for controlling access to different physical spaces according to the present invention. Each physical space is provided with an electrical locking device 12₁; . . . ; 12ₙ. The method is performed with the aid of a programmable, mobile unit 14 and a system 10. (See e.g. FIG. 1.) The method begins at block 30. The method continues, at block 32, with the step: an authority means 16 comprised in the system 10 issues access rights connected to the mobile unit 14 in the form of an authorizing data (AD). Thereafter, at block 34, the method continues with the step: to send the authorizing data (AD) to an authorization means 18 comprised in the system 10 and connected to the authority means 16. The method continues at block 36, with the step: the authorization means 18 generates an alphanumerical key for the mobile unit 14. Thereafter, at block 38, the method continues with the step: to send the alphanumerical key and a unique identifier of the mobile unit 14 to an operator 20 which is connected to the authorization means 18. The method continues, at block 40, with the step: the operator 20 sends the alphanumerical key to the mobile unit 14 identified by the unique identifier. Thereafter, at block 42, the method continues with the step: an electrical locking device 12₁ and the mobile unit 14 use an authentication protocol with the alphanumerical key to authenticate the mobile unit 14. The method continues, at block 44, with the step: if the mobile unit 14 has been authenticated, it sends the authorizing data (AD) to the electrical locking device 12₁. Thereafter, at block 45, the method continues with the step: to verify the validity of the authorization data (AD). Thereafter, at block 46, the method continues with the step: if the authorizing data (AD) comprises an identifier of the electrical locking device 12₁ the mobile unit 14 is able to open the electrical locking device 12₁, with the aid of a communication means 22 comprised in the mobile unit 14 for communication in the near field. The method is completed at block 48.

According to another embodiment of the method according to the present invention, the unique identifier of the mobile unit 14 is a number, and the authorizing data (AD) comprises an identification ($ID_1$; . . . ; $ID_n$) of each locking device 12₁; . . . ; 12ₙ which the mobile unit 14 should be able to open.

Figure 4:
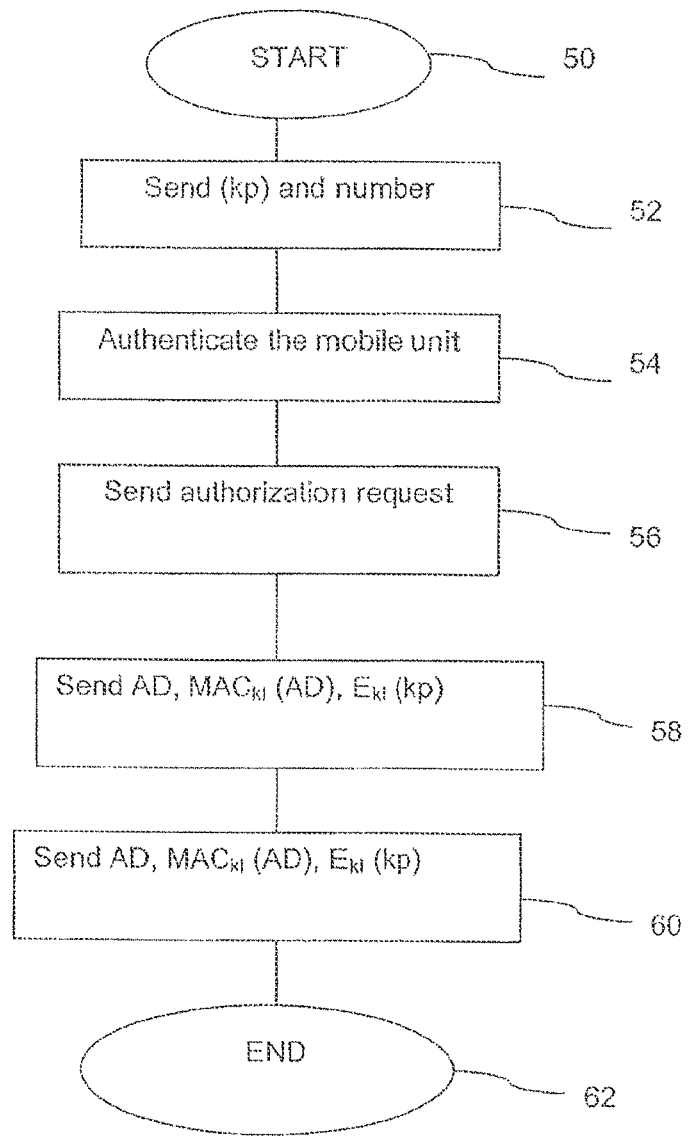
FIG. 4 shows a flow chart of a second embodiment of a method for controlling access to different physical spaces according to the present invention.

In FIG. 4 there is disclosed a flow chart of a second embodiment of a method for controlling access to different physical spaces according to the present invention. In this embodiment, the alphanumerical key is a symmetric, secret key (kp), and a physical space is provided with an electrical master locking device 24. (See FIG. 2.) This method also comprises, besides the steps of FIG. 3, the following steps: The method also begins at block 50. The method continues, at block 52, with the step: to send the secret key (kp) and the number identifying the mobile unit 14 to the master locking device 24. Thereafter, at block 54, the method continues with the step: to authenticate the mobile unit 14 with the aid of the master locking device 24 using the authentication protocol with the secret key (kp). The method continues, at block 56, with the step: if the mobile unit 14 has been authenticated, the master locking device 24 sends an authorization request to the authorization means 18. Thereafter, at block 58, the method continues with the step: with the aid of the authorization means 18, to send the authorizing data (AD) concatenated with a message authentication code ($MAC_{kl}$(AD)), and an encrypted secret key of the mobile unit 14 with a symmetric key (kl) ($E_{kl}$(kp)) to the master locking device 24. The method continues, at block 60, with the step: with the aid of the master locking device 24, to send the authorizing data (AD) concatenated with the message authentication code ($MAC_{kl}$(AD)), and the encrypted secret key of the mobile unit 14 with the symmetric key (kl) ($E_{kl}$(kp)) to the mobile unit 14 with the aid of a communication means 26 comprised in the master locking device 24 for communication in the near field. The method is completed at step 62.

According to another embodiment of the method, it also comprises the steps:
with the aid of said mobile unit 14, to send said authorizing data (AD) concatenated with said message authentication code ($MAC_{kl}$(AD)) to said electrical locking device 12₁; and
with the aid of said electrical locking device 12₁, to verify the validity of said authorizing data (AD) with said message authentication code (MAC) and said symmetric key (kl).

According to yet another embodiment of the method, it also comprises the steps:
with the aid of said authorization means 18, to generate said secret key (kp), said authorizing data (AD) concatenated with a message authentication code ($MAC_{kl}$ (AD)), and an encrypted, secret key of said mobile unit (14) with a symmetric key (kl) ($E_{kl}$(kp)); and
to send said secret key (kp), said authorizing data (AD) concatenated with said message authentication code ($MAC_{kl}$(AD)), said encrypted secret key of said mobile unit 14 with said symmetric key ($E_{kl}$(kp)), and said number to said operator 20.

According to another embodiment of the method, it also comprises the step:
with the aid of said operator 20, to send, besides said secret key (kp), said authorizing data (AD) concatenated with said message authentication code ($MAC_{kl}$(AD)), and said encrypted secret key of said mobile unit 14 with said symmetric key ($E_{kl}$(kp)) to said mobile unit 14.

According to a further embodiment of the method it also comprises the steps:
with the aid of said mobile unit 14, to establish a communication channel in the near field with said electrical locking device 12₁:

to send said encrypted key of said mobile unit 14 with said symmetric key ($E_{kl}$(kp)) to said electrical locking device 12₁; and with the aid of said electrical locking device 12₁, to retrieve said secret key (kp) by decrypting $E_{kl}$(kp) with said symmetric key (kl).

According to yet another embodiment of the method, it also comprises the steps:

with the aid of said mobile unit 14, to send said authorizing data (AD) concatenated with said message authentication code ($MAC_{kl}$(AD)) to said electrical locking device 12₁; and with the aid of said electrical locking device 12₁, to verify the validity of said authorizing data (AD) with aid message authentication code (MAC) and said symmetric key (kl).

According to another embodiment of the method, the alphanumerical key is an asymmetric key pair (privP, publP). The method also comprises the steps:

with the aid of said authorization means 18, to generate said asymmetric key pair (privP, publP), a certificate (certP), and an aces control list (AD) electronically signed by said authorization means 18 private key (privA), ($Sign_{privA}$ (AD)) for said mobile unit 14; and to send said authorizing data (AD), said private key (privP) of said mobile unit 14, said certificate (certP), said public key (pubA) of said authorization means 18, said authorization data electronically signed by said authorization means 18 private key ($Sign_{privA}$ (AD)), and said number to said operator 20.

According to yet another embodiment of the method, it also comprises the step:

with the aid of said operator 20, to send said authorizing data (AD), said private key (privP) of said mobile unit 14, said certificate (certP), said public key (pubA) of said authorization means 18 and said authorization data electronically signed by said authorization means 18 private key ($Sign_{privA}$ (AD)) to said mobile unit.

According to another embodiment of the method, it also comprises the steps:

with the aid of said mobile unit 14, to establish a communication channel in the near field with said electrical locking device 12₁;

to send said certificate (certP) to said electrical locking device 12₁; and to receive a certificate of said locking device 12₁ containing its public key (privL) (certL) from said electrical locking device 12₁.

According to yet another embodiment of the method, it also comprises the step:

with the aid of said mobile unit 14 and said electrical locking device 12₁, to authenticate each other using their certificates (certP, certL) and their private keys (privP, privL) with the aid of a two-way Authentication protocol.

According to another embodiment of the method, it also comprises the step:

if said mobile unit 14 and said electrical locking device 12₁ have been authenticated, with the aid of said mobile unit 14, to send said authorizing data (AD), and said authorization data electronically signed by said authorization means 18 private key ($Sign_{privA}$ (AD)) to said electrical locking device 12₁.

Figure 5:
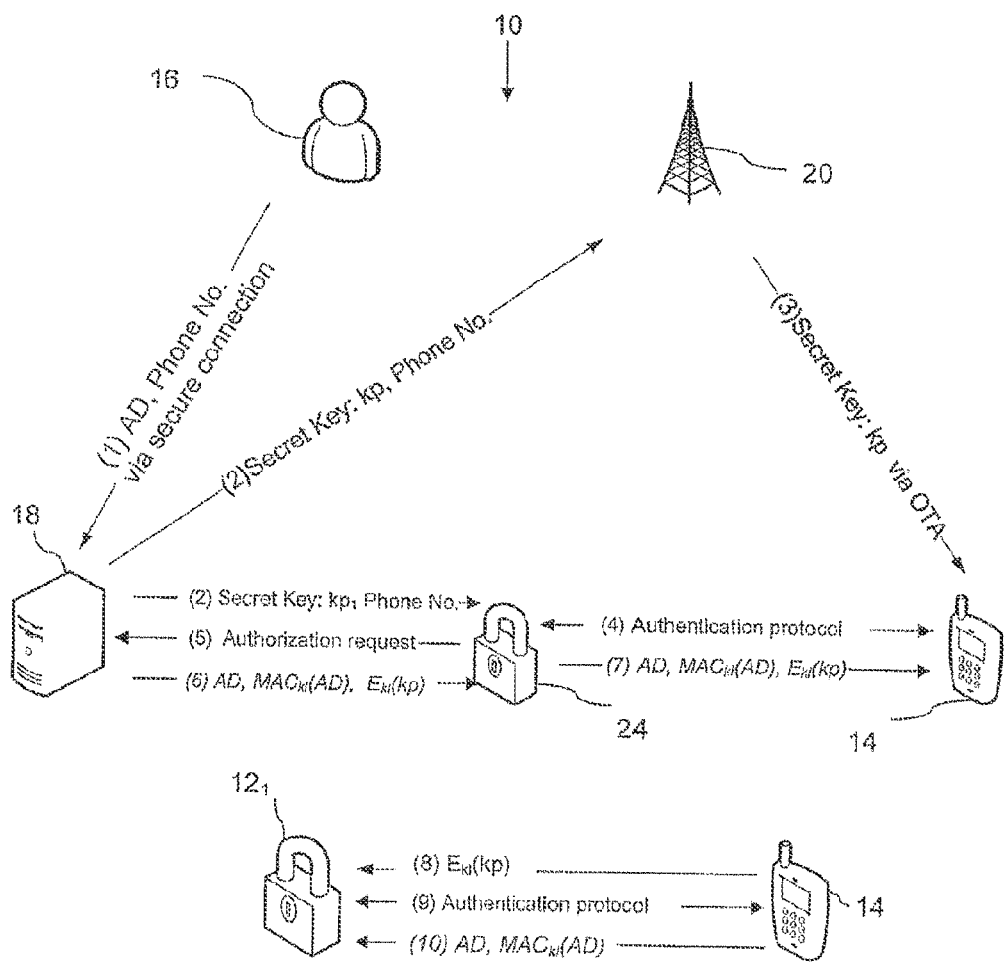
FIG. 5 schematically shows a third embodiment of a system and a method for controlling access to different physical spaces according to the present invention.

In FIG. 5 there is schematically disclosed a third embodiment of a system and method for controlling access to different physical spaces according to the present invention. The message flow shown in FIG. 5 is described below:

1) The authority 16 sends both the mobile phone number and the AD to the authorization server 18 via a secure connection.
2) The authorization server 18 generates a secret key "kp" for the mobile phone 14. Then, the server 18 sends the kp as well as the mobile phone number to both the master lock 24 and the OTA (Over The Air) operator 20 via a secure connection
3) The OTA operator 20 sends the secret key (kp) to the SIM card of the mobile phone 14 by using some OTA technique.
4) The master lock 24 and the mobile phone 14 use the Challenge Handshake Authentication protocol with kp to authenticate the phone 14.
5) After the mobile phone 14 has been authenticated, the master lock 24 sends an authorization request to the authorization server 18.
6) The authorization server 18 sends back an AD concatenated with a message authentication code "MAC" and an encrypted secret key of the phone "$E_{kl}$(kp)" to the master lock 24.
7) The master lock 24 forwards the $E_{kl}$(kp) and the AD concatenated with MAC to the mobile phone 14 using NFC.
8) When the mobile phone 14 comes to a simple lock 12₁, it sends the $E_{kl}$(kp) to the simple lock 12₁. The simple lock 12₁ retrieves kp by decrypting $E_{kl}$(kp) with kl.
9) Then, the mobile phone 14 and the simple lock 12₁ use the Challenge Handshake Authentication protocol with kp to authenticate the phone 14.
10) If the mobile phone 14 has been authenticated, it sends an AD concatenated with MAC to the simple lock 12₁. The simple lock 12₁ verifies the validity of the AD with the MAC and kl.

Finally, if the number of the simple lock 12₁ is in the AD, and all the authorization conditions are fulfilled, the lock is opened.

Figure 6:
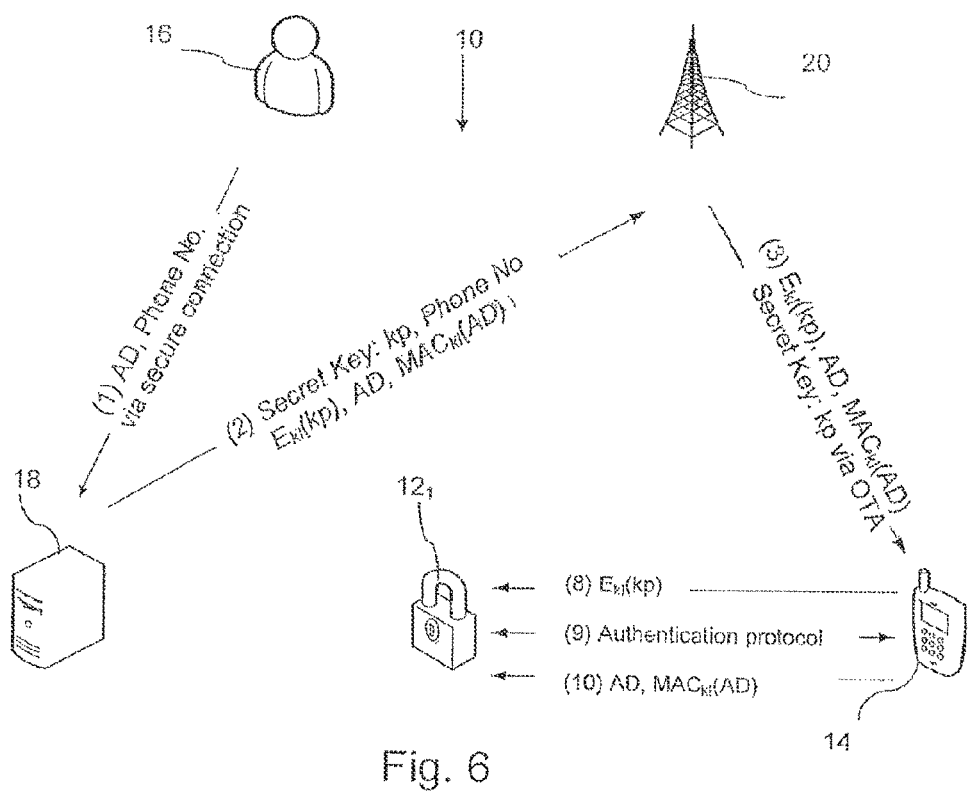
FIG. 6 schematically shows a fourth embodiment of a system and method for controlling access to different physical spaces according to the present invention.

In FIG. 6 there is schematically disclosed a fourth embodiment of a system and a method for controlling access to different physical spaces according to the present invention. The message flow shown in FIG. 6 is described below:

1) The authority 16 sends both the mobile phone number and the AD to the authorization server 18 via a secure connection.
2) The authorization server 18 generates a secret key "kp", an AD concatenated with a message authentication code "MAC" and an encrypted secret key "$E_{kl}$(kp)" for the mobile phone 14. Then, the server 18 sends the kp, $E_{kl}$(kp), AD, MAC as well as the mobile phone number to the OTA operator 20 via a secure connection.
3) The OTA operator 20 sends the kp, $E_{kl}$(kp). AD and MAC to the SIM card of the mobile phone 14 by using some OTA technique.
4) The mobile phone 14 establishes a NFC communication channel with the lock 12₁ and sends the $E_{kl}$(kp) to the lock 12₁. The lock 12₁ retrieves kp by decrypting $E_{kl}$(kp) with kl.
5) Then, the mobile phone 14 and the simple lock 12₁ use the Challenge Handshake Authentication protocol with kp to authenticate the phone 14.
6) If the mobile phone 14 has been authenticated, it sends AD concatenated with MAC to the lock 12₁. The simple lock 12₁ verifies the validity of the AD with the MAC and kl.

Finally, if the number of the simple lock 12₁ is in the AD, and all the authorization conditions are fulfilled, the lock is opened.

Figure 7:
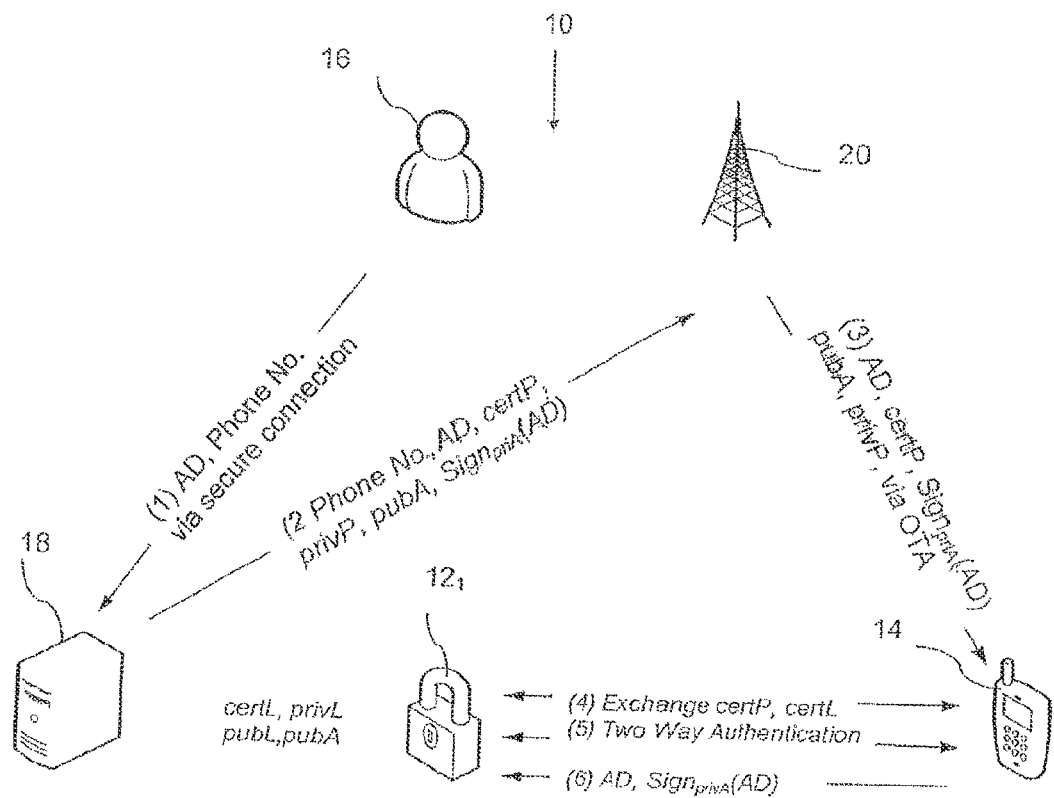
FIG. 7 schematically shows a fifth embodiment of a system and method for controlling access to different physical spaces according to the present invention.

In FIG. 7 there is schematically disclosed a fifth embodiment of a system and method for controlling access to different physical spaces according to the present invention. The message flow shown in FIG. 7 is described below:

1) The authority 16 sends both the mobile phone number and the AD to the authorization server 18 via a secure connection.
2) The authorization server 18 generates an asymmetric key pair (privP and pubP), a certificate (certP) and an AD signature signed by the authorization server's private key ($Sign_{privA}(AD)$) for the mobile phone 14. Then, the server 18 sends the AD, privP, certP. $Sign_{privA}(AD)$, mobile phone number as well as the authorization server's public key (pubA) to the OTA operator 20 via a secure connection.
3) The OTA operator 20 sends the AD, privP, certP, $Sign_{privA}(AD)$, and pubA to the SIM card of the mobile phone 14 by using OTA technique.
4) The mobile phone 14 establishes a NFC communication channel with the lock $12_1$ and exchanges the certificate with the lock $12_1$.
5) Then, the mobile phone 14 and the simple lock $12_1$ use the two-way Authentication protocol to authenticate each other using their certificates and their private keys.
6) If both sides have been authenticated, the mobile phone 14 sends the AD and $Sign_{privA}(AD)$ to the lock 12.

Finally, if the number of the simple lock is in the AD, and all the authorization conditions are fulfilled, the lock is opened.

| Symbol | Meaning |
| --- | --- |
| AD | Authorization Data<br>Contains the ids of the locks the user should be able to open |
| privP | Private key of the mobile phone |
| pubP | Public key of the mobile phone |
| $E_k(m)$ | Encryption of message m with symmetric key k |
| $MAC_k(m)$ | Message authentication code of m with symmetric key k. protects message integrity of m. |
| Kp | Symmetric key of the phone |
| Kl | Symmetric key shared between the locks |
| pubL | Public key of locks |
| $Sign_k(m)$ | Signature of m with private key k. Protects message integrity of m. |
| privA | Private key of the authorization server |
| pubA | Public key of the authorization server |
| privL | Private key of locks |
| certP | Certification of the phone containing its public key. Signed with privA |
| certL | Certification of locks containing its public key. Signed with privA |

Figure 8:
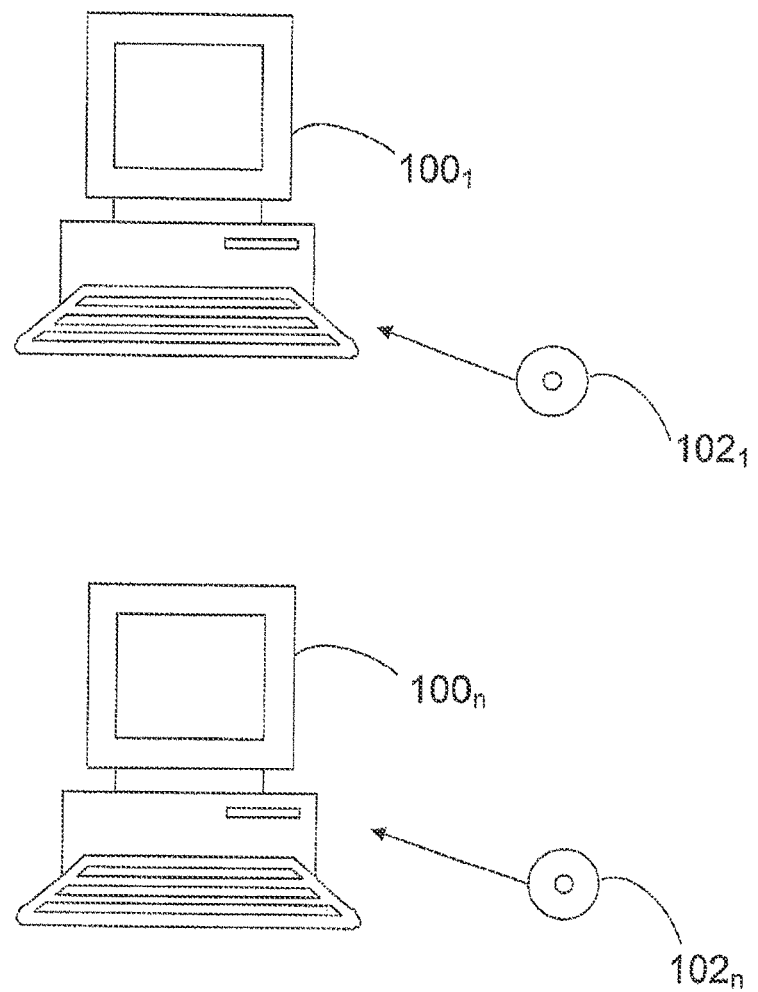
FIG. 8 schematically shows a number of computer program products according to the present invention.

In FIG. 8, some computer program products $102_1, \ldots, 102_n$ according to the present invention are schematically shown. In FIG. 8, n different digital computers $100_1, \ldots, 100_n$ are shown, where n is an integer. In FIG. 8, n different computer program products $102_1, \ldots, 102_n$ are shown, here shown in the form of CD discs. The different computer program products $102_1, \ldots, 102_n$ are directly loadable in the internal memory of the n different digital computers $100_1, \ldots, 100_n$. Each computer program product $102_1, \ldots, 102_n$ comprises software code portions for executing a part of or all the steps according to FIG. 3 or 4 when the product/products $102_1, \ldots, 102_n$ are run on said computer $100_1, \ldots, 100_n$. The computer program products $102_1, \ldots, 102_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following claims.

The invention claimed is:

1. A system operable to control access to different physical spaces, each space provided with an electrical locking device, with the aid of a programmable, mobile unit, said system comprising:
    an authority means operable to issue access rights connected to said programmable, mobile unit in the form of an authorizing data (AD),
    the authorizing data (AD) being sent to an authorization means connected to said authority means and being operable to generate an alphanumerical key for said programmable, mobile unit and send said alphanumerical key and a unique identifier of said mobile unit to an operator,
    the operator being connected to said authorization means, and being operable to send said alphanumerical key using an OTA (over-the-air) technique to said mobile unit identified by said unique identifier,
    said electrical locking device, and said mobile unit using an authentication protocol with said alphanumerical key to authenticated each other,
    said mobile unit, if said mobile unit and said electrical locking device have been authenticated, sending said authorizing data (AD) to said electrical locking device, and if said authorizing data (AD) comprises an identifier of said electrical locking device, said mobile unit is able to open said electrical locking device with the aid of a communication means comprised in said mobile unite for communication in the near field,
    said unique identifier of said mobile unit being a number, and said authorizing data (AD) comprising an identification ($ID_1; \ldots ID_n$) of each of said electrical locking device which said mobile unit should be about to open,
    said electrical locking device communicating, during access control and management of access to said locking device, only with said mobile unit.

2. The system operable to control access to different physical spaces according to claim 1, wherein said alphanumerical key is a symmetric, secret key (kp), and in that a physical space is provided with an electrical master locking device, and wherein said authorization means also is operable to send said secret key (kp) and said number identifying said mobile unit to said master locking device (24).

3. The system operable to control access to different physical spaces according to claim 2, wherein said master locking device and said mobile unit use said authentication protocol with said secret key (kp) to authenticate said mobile unit.

4. The system operable to control access to different physical spaces according to claim 3, wherein said master locking device is operable, after said mobile unit has been authenticated, to send an authorization request to said authorization means, whereafter said authorization means also is operable to send said authorizing data (AD) concatenated with a message authentication code ($MAC_{kl}(AD)$), and an encrypted, secret key of said mobile unit with a symmetric key (kl) ($E_{kl}(kp)$) to said master locking device.

5. The system operable to control access to different physical spaces according to claim 4, wherein said master locking device also is operable to send said authorizing data (AD) concatenated with said message authentication code ($MAC_{kl}(AD)$), and said encrypted secret key of said mobile unit with said symmetric key (kl) ($E_{kl}(kp)$) to said mobile unit with the aid of a communication means comprised in said master locking device for communication in the near field.

6. A system operable to control access to different physical spaces according to claim 5, wherein said mobile unit is operable to send said encrypted secret key of said mobile unit with said symmetric key (kl) ($E_{kl}(kp)$) to said electrical locking device, which in turn also is operable to retrieve said secret key (kp) by decrypting $E_{kl}(kp)$ with said symmetric key (kl).

7. The system operable to control access to different physical spaces according to claim 6, wherein said mobile unit also is operable to send said authorizing data (AD) concatenated with said message authentication code (MA $C_{kl}$ (AD)) to said electrical locking device, whereby said electrical locking device is operable to verify the validity of said authorizing data (AD) with said message authentication code (MAC) and said symmetric key (kl).

8. The system operable to control access to different physical spaces according to claim 1, wherein said alphanumerical key is a symmetric, secret key (kp), and wherein said authorization means also is operable to generate said secret key (kp), said authorizing data (AD) concatenated with a message authentication code ($MAC_{kl}(AD)$), and an encrypted, secret key of said mobile unit (14) with a symmetric key (ki) ($E_{kl}$ (kp)), and to send said secret key (kp), said authorizing data (AD) concatenated with said message authentication code ($MAC_{kl}(AD)$), said encrypted secret key of said mobile unit with said symmetric key ($E_{kl}(kp)$), and said number to said operator (20).

9. The operable to control access to different physical spaces according to claim 8, wherein said operator also is operable to send, besides said secret key (kp), said authorizing data (AD) concatenated with said message authentication code ($MAC_{kl}(AD)$), and said encrypted secret key of said mobile unit with said symmetric key ($E_{kl}(kp)$) to said mobile unit.

10. The system operable to control access to different physical spaces according to claim 9, wherein said mobile unit also is operable to establish a communication channel in the near field with said electrical locking device, and to send said encrypted secret key of said mobile unit with said symmetric key ($E_{kl}(kp)$) to said electrical locking device, which in turn also is operable to retrieve said secret key (kp) by decrypting $E_{kl}(kp)$ with said symmetric key (kl).

11. The system operable to control access to different physical spaces according to claim 10, wherein said mobile unit also is operable to send said authorizing data (AD) concatenated with said message authentication code ($MAC_{kl}$ (AD)) to said electrical locking device, whereby said electrical locking device is operable to verify the validity of said authorizing data (AD) with said message authentication code (MAC) and said symmetric key (kl).

12. The system operable to control access to different physical spaces according to claim 1, wherein said alphanumerical key is an asymmetric key pair (privP, publP), and wherein said authorization means also is operable to generate said asymmetric key pair (privP, pubiP), a certificate (certP), and an authorizing data (AD) electronically signed by said authorization means private key (privA), ($Sign_{privA}$ (AD)) for said mobile unit, and to send said authorizing data (AD), said private key (privP) of said mobile unit, said certificate (certP), said public key (pubA) of said authorization means, said authorization data electronically signed by said authorization means private key ($Sign_{privA}$ (AD)), and said number to said operator.

13. A method for controlling access to different physical spaces, each provided with an electrical locking device, with the aid of a programmable, mobile unit and with the aid of a system, said method comprising the steps of:

an authority means comprised in said system issues access rights connected to said mobile unit in the form of an authorizing data (AD)), said authorizing data (AD) comprising an identification ($ID_1$; . . . $ID_n$) of each of said electrical locking device which said mobile unit should be able to open;

to send said authorizing data (AD) to an authorization means comprised in said system and connected to said authority means;

said authorization means generates an alphanumerical key for said mobile unit;

to send said alphanumerical key and a unique identifier of said mobile unit to an operator which is connected to said authorization means, said unique identifier of said mobile unit being a number;

said operator sends said alphanumerical key using an OTA (over-the-air) technique to said mobile unit identified by said unique identifier;

wherein said electrical locking device, and said mobile unit use an authentication protocol with said alphanumerical key to authenticate each other;

if said mobile unit and said electrical locking device have been authenticated, said mobile unit sends said authorizing data (AD) to said electrical locking device;

to verify the validity of the authorization data (AD); and if said authorizing data (AD) comprises an identifier of said electrical locking device, said mobile unit is able to open said electrical locking device with the aid of a communication means comprised in said mobile unit for communication in the near field, wherein said electrical locking device communicates, during access control and management of access to said electrical locking device, only with said mobile unit.

14. The method for controlling access to different physical spaces according to claim 13, wherein said alphanumerical key is a symmetric, secret key (kp), and in that a physical space is provided with an electrical master locking device, wherein said method also comprises the step of:

said authorization means sends said secret key (kp) and said number identifying said mobile unit to said master locking device.

15. The method for controlling access to different physical spaces according to claim 14, wherein said method also comprises the step of:

to authenticate said mobile unit with the aid of said master locking device and said mobile unit using said authentication protocol with said secret key (kp).

16. The method for controlling access to different spaces according to claim 15, wherein said method also comprises the steps of:

if said mobile unit has been authenticated, with the aid of said master locking device, to send an authorization request to said authorization means; and with the aid of said authorization means, to send said authorizing data (AD) concatenated with a message authentication code ($MAC_{kl}(AD)$), and an encrypted secret key of said mobile unit with a symmetric key (kl) ($E_{kl}(kp)$) to said master locking device.

17. The method for controlling access to different spaces according to claim 16, wherein said method also comprises the step of:

with the aid of said master locking device, to send said authorizing data (AD) concatenated with said message authentication code ($MAC_{kl}(AD)$), and said encrypted secret key of said mobile unit with said symmetric key (kl) ($E_{kl}$(kp)) to said mobile unit with the aid of a communication means comprised in said master locking device for communication in the near field.

18. The method for controlling access to different physical spaces according to claim 17, characterized in that said method also comprises the steps of:
with the aid of said mobile unit, to send said encrypted secret key of said mobile unit with said symmetric key (kl) ($E_{kl}$(kp)) to said electrical locking device; and
with the aid of said electrical locking device to retrieve said secret key (kp) by decrypting $E_{kl}$(kp) with said symmetric key (kl).

19. The method for controlling access to different physical spaces according to claim 18, wherein said method also comprises the steps of:
with the aid of said mobile unit, to send said authorizing data (AD) concatenated with said message authentication code ($MAC_{kl}$(AD)) to said electrical locking device; and
with the aid of said electrical locking device, to verify the validity of said authorizing data (AD) with said message authentication code (MAC) and said symmetric key (kl).

20. The method for controlling access to different physical spaces according to claim 13, wherein said alphanumerical key is a symmetric, secret key (kp), and in that said method also comprises the steps of:
with the aid of said authorization means, to generate said secret key (kp), said authorizing data (AD) concatenated with a message authentication code ($MAC_{kl}$(AD)), and an encrypted, secret key of said mobile unit with a symmetric key (kl) ($E_{kl}$(kp)); and
to send said secret key (kp), said authorizing data (AD) concatenated with said message authentication code ($MAC_{kl}$(AD)), said encrypted secret key of said mobile unit with said symmetric key ($E_{kl}$(kp)), and said number of the mobile unit to said operator.

21. The method for controlling access to different physical spaces according to claim 20, wherein said method also comprises the step of:
with the aid of said operator, to send, besides said secret key (kp), said authorizing data (AD) concatenated with said message authentication code ($MAC_{kl}$(AD)), and said encrypted secret key of said mobile unit with said symmetric key ($E_{kl}$(kp)) to said mobile unit.

22. The method for controlling access to different physical spaces according to claim 21, wherein said method also comprises the steps of:
with the aid of said mobile unit, to establish a communication channel in the near field with said electrical locking device;
to send said encrypted key of said mobile unit with said symmetric key ($E_k$i(kp)) to said electrical locking device; and
with the aid of said electrical locking device, to retrieve said secret key (kp) by decrypting $E_{kl}$(kp) with said symmetric key (kl).

23. The method for controlling access to different physical spaces according to claim 22 wherein said method also comprises the steps of:
with the aid of said mobile unit, to send said authorizing data (AD) concatenated with said message authentication code ($MAC_{kl}$(AD)) to said electrical locking device; and
with the aid of said electrical locking device, to verify the validity of said authorizing data (AD) with aid message authentication code (MAC) and said symmetric key (kl).

24. The method for controlling access to different physical spaces according to claim 13, wherein said alphanumerical key is an asymmetric key pair (privP, publP), and wherein said method also comprises the steps of:
with the aid of said authorization means, to generate said asymmetric key pair (privP, publP), a certificate (certP), and an authorizing data (AD) electronically signed by said authorization means private key (privA), ($Sign_{PrivA}$ (AD)) for said mobile unit; and
to send said authorizing data (AD), said private key (privP) of said mobile unit, said certificate (certP), said public key (pubA) of said authorization means, said authorization data electronically signed by said authorization means private key ($Sign_{privA}$ (AD)), and said number of the mobile unit to said operator.

25. At least one computer program stored on a non-transitory computer readable medium the at least one computer program comprising software code portions for performing the steps of claim 13 when executed by at least one computer.

* * * * *